United States Patent [19]

Shiraishi et al.

[11] Patent Number: 4,624,335
[45] Date of Patent: Nov. 25, 1986

[54] FAIL SAFE STEERING EFFORT CONTROL SYSTEM

[75] Inventors: Yasuhiro Shiraishi, Zama; Makoto Miyoshi, Kawasaki, both of Japan

[73] Assignee: Nissan Motor Co., Ltd., Yokohama, Japan

[21] Appl. No.: 660,154

[22] Filed: Oct. 12, 1984

[30] Foreign Application Priority Data

Oct. 13, 1983 [JP] Japan ............................ 58-189821

[51] Int. Cl.⁴ .............................................. B62D 5/06
[52] U.S. Cl. .................................. 180/142; 180/79.1; 180/133
[58] Field of Search ............... 180/142, 133, 79.1, 180/132

[56] References Cited
U.S. PATENT DOCUMENTS 3,820,619  6/1974  Ezoe et al. ........................ 180/142
4,034,193  7/1977  Jackson ............................ 222/36

Primary Examiner—John J. Love
Assistant Examiner—Donn McGiehan
Attorney, Agent, or Firm—Schwartz, Jeffery, Schwaab, Mack, Blumenthal & Evans

[57] ABSTRACT

An actuator (7) for varying the degree of power assistance is connected with a main battery (8) through a first fuse (12) separate from a second fuse (13) which protects a controller (1) such as a microcomputer for controlling the steering effort in accordance with the vehicle speed and other variables. An emergency control means (14–18) is connected with the actuator for preventing the steering from becoming abnormally heavy or light when the controller is isolated from the main battery. The emergency control means keeps the steering moderate by using a backup battery or by limiting a current supplied to the actuator to a predetermined value.

4 Claims, 4 Drawing Figures

FAIL SAFE STEERING EFFORT CONTROL SYSTEM

BACKGROUND OF THE INVENTION

The present invention relates to a power steering system capable of controlling the steering effort in accordance with at least one variable such as vehicle speed, steering speed or steering angle. More specifically, the present invention relates to a fail safe control system for keeping the steering effort moderate when a failure occurs in the power supply for a steering effort control unit.

If a fuse blows and a control unit for a steering effort control is isolated from its power source, the power steering system loses control of an actuator for varying the degree of power assistance, and the steering effort becomes extremely heavy or light.

SUMMARY OF THE INVENTION

It is an object of the present invention to provide a fail safe steering effort control system designed so as to prevent the steering effort from becoming extremely heavy or light by holding the steering effort moderate when the supply of power to a control unit for controlling the steering effort is stopped.

According to the present invention, a fail safe steering effort control system for a vehicle power steering, comprises means for sensing at least one variable of a condition of the vehicle, an actuator for varying a steering effort, main control means for regulating the actuator, a main battery for supplying power to the actuator and the main control means, first and second fuses for protecting, respectively, the main control means and the actuator, and emergency control means. The main control means is connected with the sensing means for regulating the actuator by sending a control signal to control the steering effort in accordance with the variable. The main battery is connected with the main control means through a first power circuit, and with the actuator through a second power circuit. The first fuse is inserted in the first power circuit. The second fuse is inserted in the second power circuit so that the actuator can be supplied with power from the main battery even when the first fuse opens the first power circuit. The emergency control means is connected with the actuator for providing the actuator with an emergency control signal to control the steering effort in a predetermined manner when the supply of power to the controller is stopped.

DETAILED DESCRIPTION OF THE INVENTION

Figure 1:
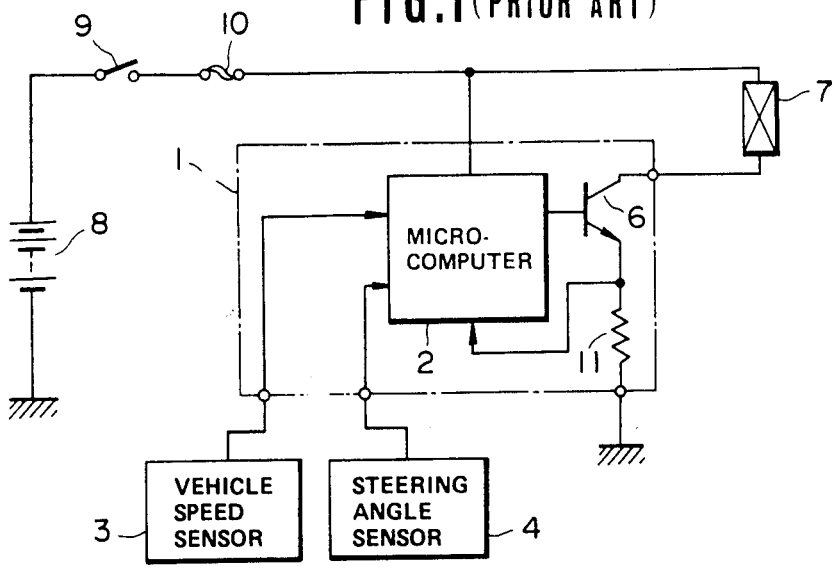
FIG. 1 is a schematic circuit diagram of a conventional example.

One conventional example of a steering effort control system is shown in FIG. 1 for the purpose of comparison. As shown in FIG. 1, a controller 1 has a microcomputer 2, which is connected with a vehicle speed sensor 3 and a steering angle sensor 4. The microcomputer 2 determines the steering effort in accordance with the vehicle speed and/or the steering angle and/or the steering speed which can be obtained by differentiating the steering angle. For example, the microcomputer 2 makes the steering light at low vehicle speeds, and makes it heavier as the vehicle speed increases. The microcomputer 2 sends a control signal representing the determined steering effort to a power transistor 6, and controls a current passing through an actuator 7 for varying the degree of power assistance so that the determined steering effort can be obtained. A current sensing resistor 11 is connected to the emitter of the power transistor 6. The current of the actuator 7 is detected by the current sensing resistor 11 and fed back to the microcomputer 2.

The controller 1 and the actuator 7 are supplied with power from a battery 8 through an ignition switch 9 and a fuse 10.

The microcomputer 2 may have a fail safe means for fixing the steering effort at a moderate value if a failure of the vehicle speed sensor 3 or the steering angle sensor 4 is detected.

If the fuse 10 blows because of a short circuit, not only the controller 1 but also the actuator 7 is disconnected from the battery 8. Therefore, the actuator 7 is liable to make the steering effort extremely heavy or light. In one type of the steering effort control, the steering effort is controlled with a fluid flow control valve so disposed in a bypass passage as to control the amount of a power fluid supplied to a power steering actuator for providing power assistance to a steering linkage. In this case, the flow control valve becomes fully closed or fully open when the supply of power to the actuator 7 is stopped. If the flow control valve of the bypass passage is made fully closed, all the power fluid discharged from a fluid pump is supplied to the power steering actuator such as a power cylinder, and the steering becomes extremely light. If the flow control valve is made fully open, the power fluid supply becomes insufficient, and the steering becomes extremely heavy.

Figure 2:
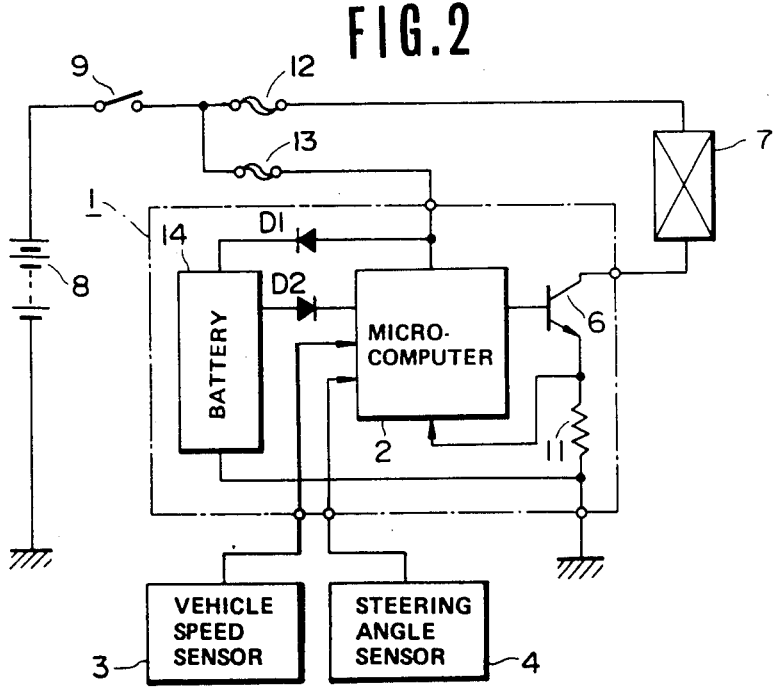
FIG. 2 is a schematic circuit diagram showing a first embodiment of the present invention.

A first embodiment of the present invention is shown in FIG. 2.

A controller 1 has a microcomputer 2 for controlling a steering effort according to a program. A vehicle speed sensor 3 and a steering angle sensor 4 are connected to the microcomputer 2. A vehicle speed detected by the vehicle speed sensor 3 and a steering angle detected by the steering angle sensor 4 are input to the microcomputer 2. The microcomputer 2 is capable of determining a steering speed which is the time rate of change of the steering angle by differentiating the steering angle detected by the steering angle sensor 4.

The microcomputer 2 controls the steering effort or the degree of power assistance by producing a control signal. For example, the microcomputer 2 controls the steering effort in accordance with the vehicle speed so that the steering is light at low speeds, and becomes heavier as the vehicle speed increases. The control signal of the microcomputer 2 is applied to the base of a power transistor 6. The collector of the power transistor 6 is connected to an actuator 7 for varying the steering effort of the power steering. For example, the actuator 7 can vary the steering effort by varying the amount of a hydraulic fluid supplied to a power cylinder of the power steering system by the use of a bypass flow control valve. In this case, the bypass flow control valve is disposed in a bypass passage which allows the fluid driven by a fluid pump toward the power cylinder to bypass the power cylinder and direclty return to a reservoir. The actuator 7 controls the flow rate of the bypass passage by controlling the opening degree of the bypass flow control valve by means of a linear solenoid or the like.

The emitter of the power transistor 6 is connected with a current sensing resistor 11. The value of the current of the actuator 7 is detected by the current sensing resistor 11, and fed back to the microcomputer 2. The microcomputer 2 controls the the current passing through the actuator 7 by the aid of the power transistor 6 and the current sensing resistor 11.

A main battery 8 is connected to the microcomputer 2 and the actuator 7 by conductors. A common conductor joins the main battery 8 to a branch point. A first conductor extends from the branch point to the microcomputer 2, and a second conductor extends from the branch point to the actuator 7. An ignition switch 9 is disposed in the common conductor, so that both of the microcomputer 2 and the actuator 7 are disconnected from the main battery 8 when the ignition switch 9 is turned off. A first fuse 13 is inserted in the first conductor so that only the microcomputer 2 is disconnected from the main battery 8 when the first fuse 13 melts. A second fuse 12 is inserted in the second conductor so that only the actuator 7 can be disconnected from the main battery 8 by the second fuse 12. The controller 1 of the first embodiment has a backup battery 14 for supplying electric energy to the microcomputer 2 when the supply of power from the main battery 8 to the microcomputer 2 is stopped. For example, a nickel-cadmium battery is used as the backup battery 14. The backup battery 14 is connected with the first conductor through a diode D1. The backup battery 14 is charged with the power of the main battery 8 in a normal condition in which the microcomputer 2 is supplied with power from the main battery 8 through the first fuse 13. The backup battery 14 is connected to the microcomputer 2 through a diode D2 so that the backup battery 14 can supply power to the microcomputer 2.

In the normal condition, the main battery 8 supplies power to the controller 1 through the first fuse 13, and to the actuator 7 through the second fuse 12 when the igntion switch 9 is turned on. The microcomputer 2 determines the steering effort in accordance with at least one variable of the vehicle speed, the steering angle and the steering speed, for example, by the use of a program. The microcomputer 2 controls the current of the actuator 7 by sending the control signal to the power transistor 6 so that the steering effort is controlled as determined.

If the first fuse 13 for protecting the microcomputer 2 melts because of a short circuit or other cause, the supply of power from the main battery 8 to the microcomputer 2 is stopped, and instead, the backup battery 14 supplies power to the microcomputer 2 through the diode D2. At the same time, the microcomputer 2 detects that the power circuit is opened by the first fuse 13, by the use of an abnormal detection program or other means, and steps into a fail safe control program which is so designed that the breakage of the first fuse 13 cannot cause a dangerous change of the steering effort. For example, according to the fail safe control program, the microcomputer 2 fixes the current value of the actuator 7 by sending the control signal of a fixed value to the power transistor 6, and by so doing maintains the steering effort at a contant value intermediate between upper and lower limits between which the steering effort is normally controlled. This constant value of the steering effor may be approximately equal to the mean value of the upper and lower limits. The microcomputer 2 is arranged to warn the driver of a failure of the power supply by means of a warning device.

Figure 3:
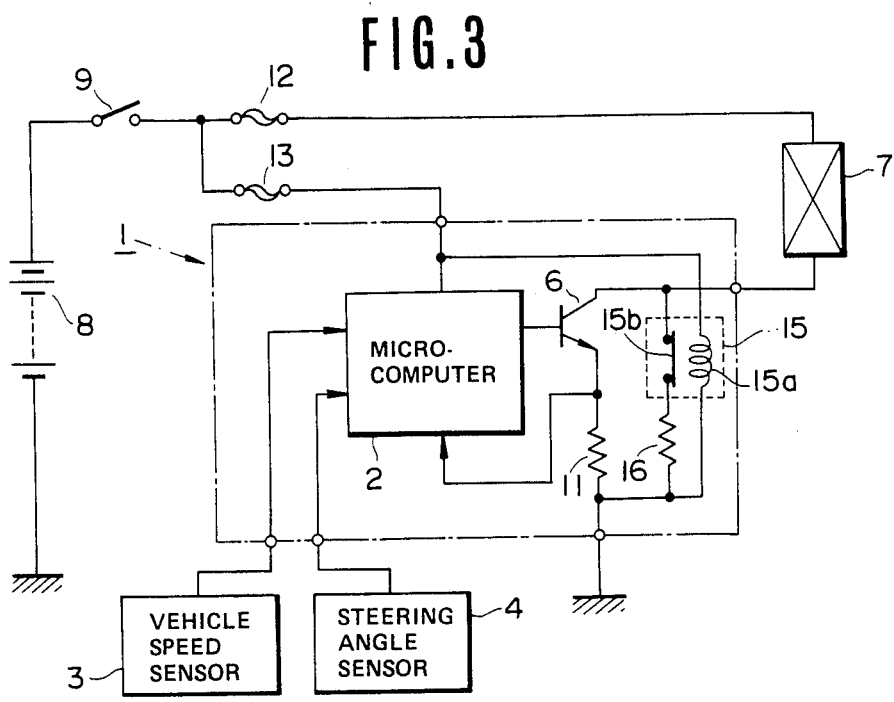
FIG. 3 is a schematic circuit diagram showing a second embodiment of the present invention.

A second embodiment of the present invention is shown in FIG. 3. In this embodiment, the fail safe control is performed by using power supplied to the actuator 7 from the main battery 8 without using the backup battery. As in the first embodiment, the microcomputer 2 of the second embodiment receives power from the main battery 8 through the first fuse 13 separated from the second fuse 12 for the actuator 7, and controls the actuator 7 by the use of the power transistor 6 and the resistor 11. Unlike the first embodiment, the controller 1 of the second embodiment has a relay 15 having a relay coil 15a and a normally closed relay contact 15b. The relay coil 15a is supplied with power from the main battery 8 through the first fuse 13 of the microcomputer 2. The normally closed relay contact 15b is inserted in a branch containing a current determining resistance 16, and this branch is connected in parallel with the series circuit of the power transistor 6 and the current sensing resistor 11.

In the normal condition, the relay coil 15a is energized with power supplied from the main battery 8 through the first fuse 13, so that the normally closed relay contact 15b is opened. Therefore, the mircocomputer 2 controls the degree of power assistance by controlling the power transistor 6 in the normal manner.

In the emergency condition in which the first fuse 13 opens the power circuit for the microcomputer, the relay coil 15a is deenergized, and the relay contact 15b is closed. In this condition, the actuator 7 is connected with the main battery 8 through the second fuse 12, so that a constant current passes through the actuator 7, the relay contact 15b and the current determining resistor 16. The actuator 7 maintains the steering effort at a constant value determined by the constant current. The constant current is determined by the resistor 16 at such a valve that the steering effort is fixed at a value approximately equal to the mean value of the upper and lower limits between which the steering effort is normally controlled.

Figure 4:
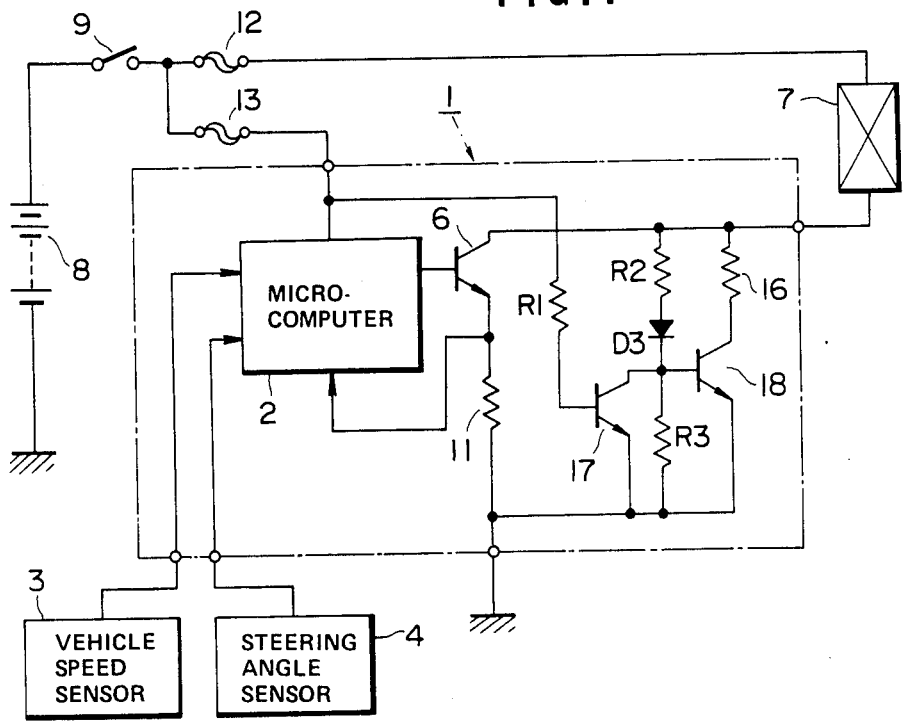
FIG. 4 is a schematic circuit diagram showing a third embodiment of the present invention.

A third embodiment of the present invention is shown in FIG. 4. In the third embodiment, the relay 15 of the second embodiment is replaced by a transistor circuit.

The base of a first transistor 17 is connected with the main battery 8 through the first fuse 13 of the microcomputer 2 and a resistor R1. The first transistor 17 is switched on in the normal condition in which the microcomputer 2 is supplied with power from the main battery 8 through the first fuse 13. The first transistor 17 is cut off in the emergency condition in which the microcomputer 2 is isolated from the power supply. The collector of the first transistor 17 is connected to the base of a second transistor 18, whose collector is connected to the actuator 7 through the current determining resistor 16. The emitter of the second transistor 18 is connected to a grounded terminal of the current sensing resistor 11 connected in series with the power transistor 6. A series circuit of the second transistor 18 and the current determining resistor 16 is connected in parallel with the series circuit of the power transistor 6 and the current sensing resistor 11. The base of the second transistor 18 is connected with the bias circuit containing a resistor R2, a diode D3 and a resistor R3.

In the normal condition in which both of the first and second fuses 12 and 13 are normal, the first transistor 17 is supplied with power from the main battery 8 through the first fuse 13 and the resistor R1, so that the first transistor 17 is conducting. Therefore, the first transistor 17 holds the voltage at the base of the second transistor 18 at zero volts, and accordingly the second transistor 18 is cut off.

In the emergency condition in which the first fuse 13 melts and opens the circuit for supplying power from the main battery 8 to the microcomputer 2, the first transistor 17 is turned off, and the second transistor 18 is turned on by receiving power from the main battery 8 through the actuator 7. In this state, the microcomputer 2 stops producing the control signal, and the power transistor 6 is in the off state. Therefore, a constant current determined by the current determining resistor 16 flows through the actuator 7, which maintains the steering effort constant.

The fail safe control systems of the present invention can prevent the steering from becoming extremely heavy or light in the emergency condition by maintaining the steering effort at a medium level or limiting the steering effort within a moderate range.

What is claimed is:

1. A fail safe steering effort control system for vehicle power steering comprising:

means for sensing at least one variable of a condition of the vehicle, an actuator for varying a steering effort, main control means, connected with said sensing means, for regulating said actuator by regulating a current for driving said actuator thereby generating a control signal to control the steering effort in accordance with the variable, a main battery connected with said main control means through a first power circuit, and connected with said actuator through a second power circuit, a first fuse inserted in said first power circuit, a second fuse inserted in said second power circuit so that said actuator can be supplied with power from said main battery even when said first fuse opens said first power circuit, and emergency control means, connected with said actuator, for providing said actuator with an emergency control signal to control the steering effort in a predetermined manner when the supply of power of said controller is stopped, said emergency control means also connected with said main battery through said first and second power circuits so that said emergency control means is an emergency state and is supplied with power from said main battery via said second power circuit and generates said emergency control signal when said first fuse opens said first power circuit, and said emergency control means is in a normal state to allow normal operation of said main control means when said main control means is supplied with power from said main battery through said first power circuit;

wherein said emergency control means comprises a current determining resistor means connected with said actuator for determining a fixed value of current supplied by said main battery to said actuator, a switching means connected in series with said current determining resistor means, and an operating means connected with said first power supply circuit for holding said switching means in an open state when said emergency control means is in the normal state and for providing said fixed value of current for driving said actuator in the emergency state.

2. A system according to claim 1, wherein said main battery, said second fuse, said actuator, said switching means and said current determining resistor are connected in series to form a series circuit.

3. A system according to claim 2, wherein said switching means comprises a normally closed relay contact, and said operating means comprises a relay coil.

4. A system according to claim 2, wherein said operating means comprises a first transistor which is in an on state when said main control means is supplied with power from said main battery through said first fuse, and in an off state when said main control means is not supplied with power through said first fuse, and said switching means comprises a second transistor which is in an off state when said first transistor is in the on state, and in an on state when said first transistor is in the off state.

* * * * *